United States Patent [19]

Ronemus et al.

[11] Patent Number: 4,538,040
[45] Date of Patent: Aug. 27, 1985

[54] ELECTRICAL SWITCH MEANS PARTICULARLY ADAPTED TO GFCI TEST AND RESET SWITCHES

[75] Inventors: DeHertburn N. Ronemus, North Syracuse; Victor M. Tice, Manlius, both of N.Y.

[73] Assignee: Pass & Seymour, Inc., Solvay, N.Y.

[21] Appl. No.: 539,155

[22] Filed: Oct. 5, 1983

[51] Int. Cl.³ .............................................. H01H 1/26
[52] U.S. Cl. ................................ 200/159 A; 200/1 R
[58] Field of Search ............... 200/159 A, 159 B, 292, 200/1 R

[56] References Cited

U.S. PATENT DOCUMENTS

| | | | |
|---|---|---|---|
| 2,469,650 | 5/1949 | Isserstedt | 200/159 A |
| 2,624,809 | 1/1953 | Sinclaire | 200/159 A |
| 2,981,816 | 4/1961 | Cozart | 200/159 A |
| 3,204,069 | 8/1965 | West | 200/159 B |
| 3,971,902 | 7/1976 | Wulf et al. | 200/159 A |

FOREIGN PATENT DOCUMENTS

| | | | |
|---|---|---|---|
| 2657546 | 6/1978 | Fed. Rep. of Germany | 200/292 |
| 606437 | 7/1960 | Italy | 200/159 B |

Primary Examiner—Stephen Marcus
Assistant Examiner—Renee S. Kidorf
Attorney, Agent, or Firm—Charles S. McGuire

[57] ABSTRACT

A pair of separate electrical switches are disclosed, each including a fixed contact supported by and electrically connected to a printed circuit board, and a movable contact comprising a deflectable portion of a strip of springy, conducting material. A single such strip is supported by and electrically connected to terminals of the circuit board in a central portion of the strip, the opposite end portions forming the movable switch contacts. A pair of push rods are carried by spaced, flexible, rubber boots which position the push rods and move them axially to urge the respective ends of the strip to a deflected position which moves one strip end away from the associated pin, opening a normally closed switch, and moves the other strip end to contact the pin, closing a normally open switch. The electrical and physical configuration of the switches is particularly suited to use as test and reset switches of a ground fault circuit interrupter device, in which context the invention is disclosed.

3 Claims, 5 Drawing Figures

U.S. Patent   Aug. 27, 1985   Sheet 1 of 2   4,538,040
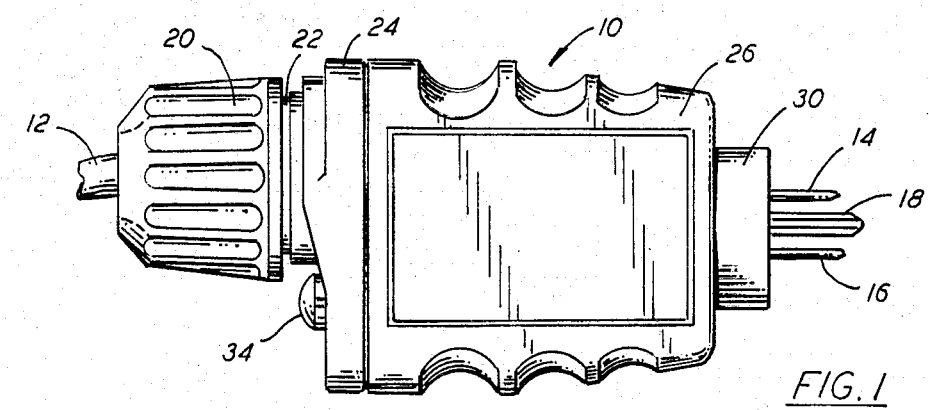
FIG. 1
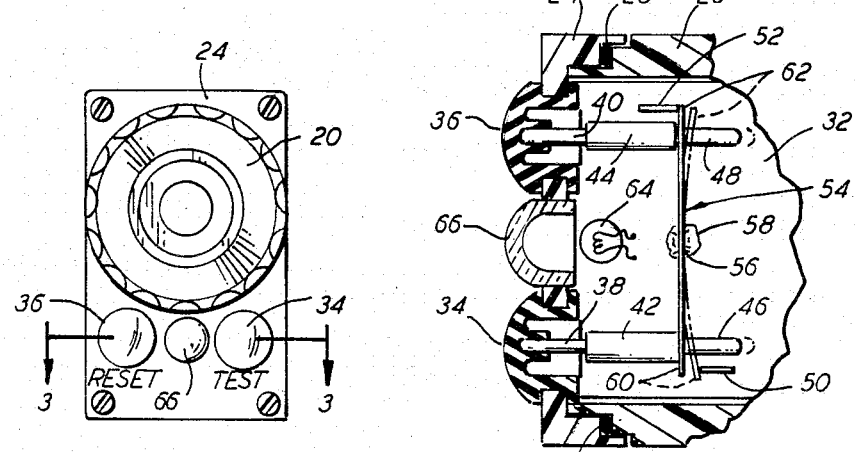
FIG. 2
FIG. 3
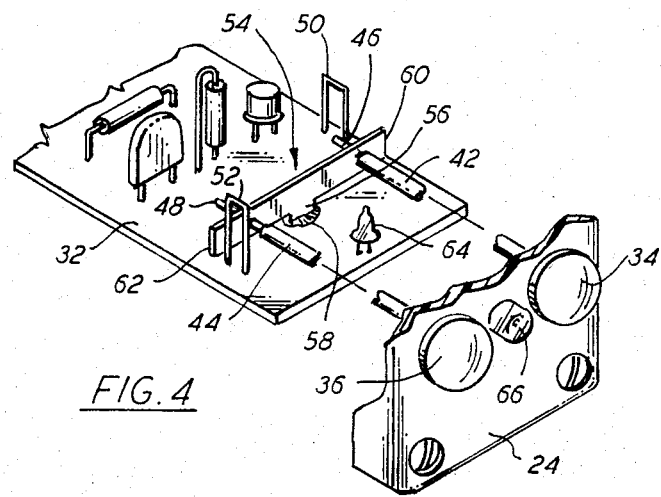
FIG. 4

ELECTRICAL SWITCH MEANS PARTICULARLY ADAPTED TO GFCI TEST AND RESET SWITCHES

BACKGROUND OF THE INVENTION

The present invention relates to electrical switches of the push-button, momentary contact type, biased toward one position (open or closed) and deflectable by applied manual pressure to the other position. More specifically, the invention concerns electrical switches having fixed and movable contacts mounted upon and electrically connected to printed circuit boards, particularly as employed in the test and reset circuits of ground fault protection devices.

In copending U.S. Pat. applications Ser. Nos. 539,153 and 539,154, both filed of even date herewith and assigned to applicant's assignee, there is disclosed a ground fault circuit interrupter (GFCI) device having unique features of physical construction and of circuit design. As in many electrical devices of the class which has come to be known as GFCI equipment, provision is made for testing proper operation by closing a switch in the circuit to produce a condition analagous to that produced by the type of ground fault in response to which the GFCI is designed to be actuated. A lamp is illuminated to indicate that the GFCI has responded properly to the test. In order to resume normal operation, it is necessary to "reset" the circuit, for which purpose another switch is provided.

The circuit components of the GFCI device of the aforementioned applications, i.e., resistors, capacitors, diodes, zeners, and other solid state devices, are carried on a printed circuit board contained within housing means. Thus, it is desireable to incorporate the electrical portions of the test and reset switch structure with the circuit board, and the manually engageable portions of the switch actuating means with the housing means in the most efficient and reliable manner, which is the principal object of the present invention.

In a more general sense, the object of the invention is to provide novel electrical switch means of the momentary contact type comprising a pair of separate switches each having a movable contact connected to a common terminal.

A further object is to provide novel test and reset switch structure for a GFCI device having manual actuating means incorporated with waterproof housing of the device.

Other objects will in part be obvious and will in part appear hereinafter.

SUMMARY OF THE INVENTION

The switch means of the invention comprise a pair of fixed contacts in the form of pins extending from physical and electrical connection to a printed circuit board. Movable contacts for two momentary contact switches are provided by opposite ends of a single strip of springy, electrically conducting material. The strip is also physically supported upon and electrically connected to terminals of the circuit board in a central portion of the strip, leaving the ends free to be flexed toward and away from the fixed contacts. The strip is so mounted with respect to the pins that in the normal or unflexed condition, one end of the strip is in contact with the adjacent pin and the other strip end is spaced from the other pin, whereby one of the switches formed by the fixed and movable contacts is "normally closed" and the other is "normally open".

The printed circuit board is supported within housing means having a wall parallel to and spaced a short distance from the flexible strip. A pair of short push rods or plungers are mounted for axial movement with portions engaging the respective ends of the flexible strip and other portions extending through openings in the housing wall. The push rods are movable in one direction from a rest position by manual engagement of structure external to the housing and connected to the rods, such as flexible rubber boots press fitted into the wall openings.

The normally open contacts form the test switch of a GFCI device, being connected through appropriate circuitry to means for creating an apparent ground fault condition when closed, thereby interrupting circuit continuity between an electrical power source and load upon proper operation. The test switch is closed by manual movement of the boot connected to the push rod which flexes the associated end of the strip into engagement with the adjacent fixed pin. When manual pressure is released, the boot, push rod and strip end return to their original positions, opening the switch, due to the spring action of the strip and the same action of the rubber boot connected to the end of the push rod.

The reset switch is operated in the same manner, with manual pressure applied to the rubber boot connected to the push rod, moving the latter to flex the opposite strip end away from contact with the associated pin, opening the switch and immediately resetting the GFCI circuit for normal operation. The rubber boots provide a waterproof means for manual engagement on the exterior of the GFCI housing for actuating the test and reset switch structure inside the housing, while also serving to align, retain and position the push rods which move the flexible spring member. The rubber boots thus act as a bearing or detent means, providing the necessary flexibility within the intended operating temperature range of the GFCI device.

A test lamp is also physically and electrically connected to the circuit board and is illuminated in response to proper actuation of the GFCI to interrupt the circuit between source and load upon actuation of the test switch, and is turned off by actuation of the reset switch.

BRIEF DESCRIPTION OF THE DRAWINGS

FIG. 1 is a side elevational view of a GFCI module incorporating the novel switch means of the invention;

FIG. 2 is a front elevational view of the module of FIG. 1;

FIG. 3 is an enlarged, fragmentary, sectional view of a portion of the module, taken on line 3—3 of FIG. 2;

FIG. 4 is a fragmentary, perspective view of the mechanical elements of the switch means.

DETAILED DESCRIPTION

Figure 5:
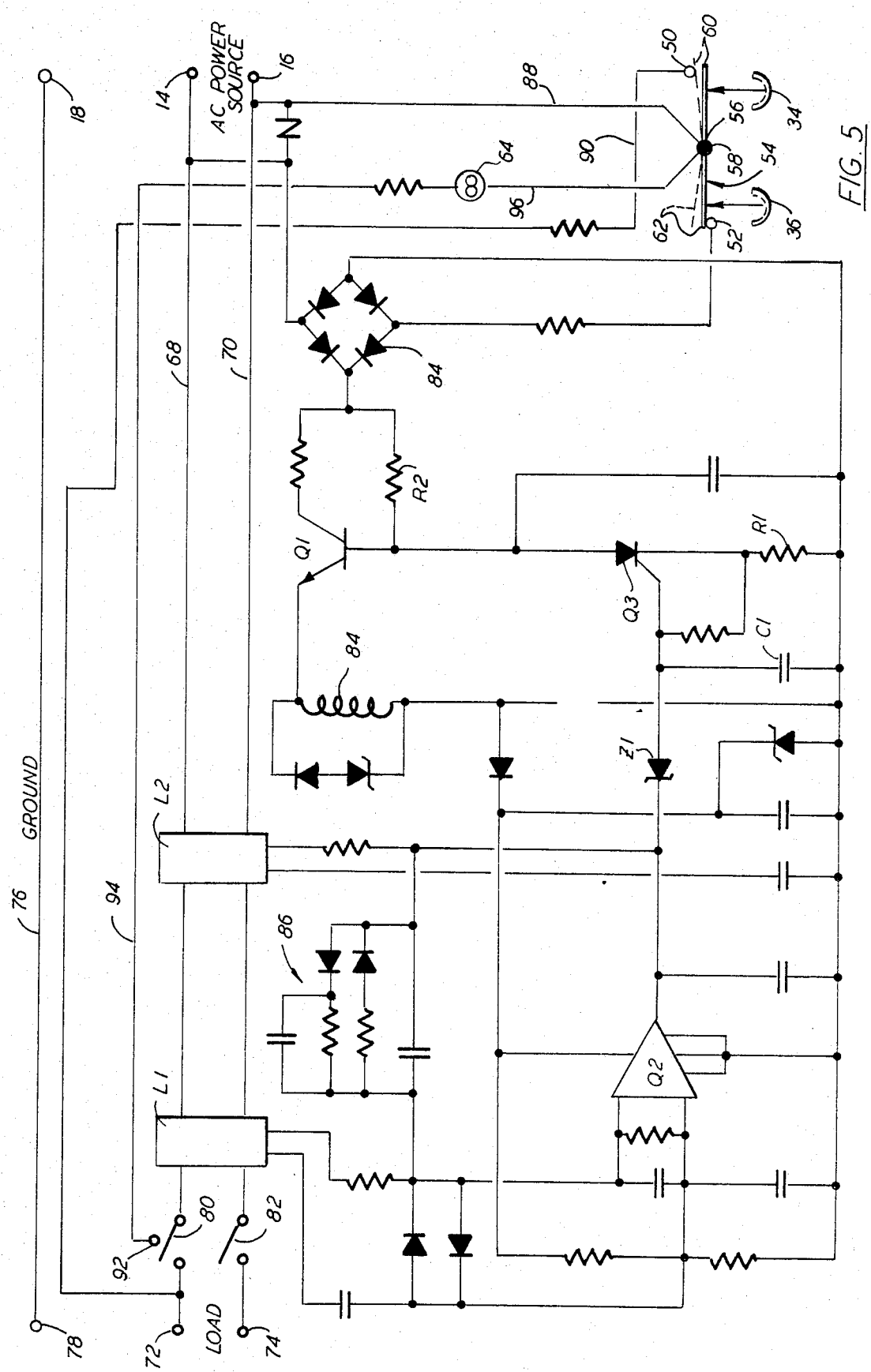
FIG. 5 is a schematic diagram of an electrical circuit incorporating the switch means of the invention.

Referring now to the drawings, in FIG. 1 is shown a module denoted generally by reference numeral 10 which is adapted to receive line cord 12 from a conventional electrical appliance or other load operated from a source of electrical power to which module 10 is connected by insertion of connector blades 14, 16 and 18 in a standard receptacle. Module 10 includes hollow, dome-shape cap 20, having a central opening in which a resilient rubber grommet (not shown) is positioned, through which line cord 12 passes in sealing engagement. Cap 20 has internal threads which engage external threads on collar 22 of cover member 24 for assembly of the two elements with a sealing O-ring therebetween. The individual wires of cord 12, e.g., hot, neutral and ground wires, are connected to respective terminals on collar 22 at one end of conductors (not shown) which extend through a solid wall formed by cover member 24 to terminals at opposite ends within hollow body member 26. Cover member 24 is sealingly engaged by O-ring 28 (FIG. 3) to body member 26, and an opening at the other end defined by collar 30 is sealingly closed by a plug assembly from which blades 14, 16 and 18 extend.

Body member 26 houses a conventional, electromechanical relay and printed circuit board 32 which carries the components of an electrical network, shown schematically in FIG. 5 and described later in detail. The network operates to interrupt the circuit between the source of electrical power provided at the receptacle wherein blades 14, 16 and 18 are inserted and the load connected to line cord 12 in response to a ground fault in the circuit. A more detailed disclosure of the physical construction and assembly of the elements of module 10 may be found in aforementioned application Ser. No. 539,154.

Flexible rubber boots 34 and 36 are press fitted into openings in the front wall of cover member 24. A pair of push rod elements include respective end portions 38 and 40, frictionally received in central, internal openings in boots 34 and 36, enlarged central portions 42 and 44, and opposite end portions 46 and 48. Fixed switch contacts in the form of U-shaped pins 50 and 52 are physically and electrically connected to circuit board 32, extending upwardly from one side thereof. Elongated strip 54 of electrically conducting material is fixedly connected to circuit board 32 and electrically connected to terminals thereof at strip central portion 56 by solder connection 58. End portions 46 and 48 of the push rods extend loosely through openings formed for such purpose in strip 54. Manual pressure on either of boots 34 and 36 will deform the boot toward cover 24 and move the associated push rod axially due to engagement of end portions 38 and 40 thereof with the boots. Upon release of manual pressure, boots 34 and 36 resume their normal positions, shown in FIG. 3.

While end portions 46 and 48 of the push rods are of smaller cross section than the openings through which they pass in strip 54, portions 42 and 44 are of larger cross section. Relative positioning of the push rods and strip 54 in the fully assembled condition of module 10 is such that axial movement of push rod portion 42 engages and flexes strip 54 to move end 60 thereof from the solid to the dotted line position of FIG. 3, i.e., from spaced to contacting relation to fixed pin 50. Likewise, axial movement of push rod portion 44 by manual depression of boot 36 engages and flexes strip 54 to move end 62 thereof from the solid to the dotted line position of FIG. 3, i.e., from contacting to spaced relation with fixed pin 52.

Small neon lamp 64 is also mounted upon and electrically connected to circuit board 32, being positioned directly behind transparent window or lens 66 on cover 24 in the fully assembled condition of module 10. As explained later in connection with the electrical operation of the switch means and associated circuitry, closing the test switch by moving strip end 60 into contact with pin 50 results in illumination of lamp 64 upon proper operation of the GFCI to interrupt the circuit between the source and load. Lamp 64 remains illuminated until the reset switch is operated by moving strip end 62 out of contact with pin 52, thereby restoring the GFCI to its original condition for normal operation and removing power from lamp 64.

Turning now to FIG. 5, the operation of the switch means in the electrical circuit of the GFCI will be described. Module 10 is intended for use with a 110 or 220 volt, 60 hertz, single phase, AC power distribution system although the switch means of the present invention may obviously be utilized in other circuits. The supply and return, more commonly termed the hot and neutral, conductors 68 and 70 extend within module 10 from blades 14 and 16 to terminals 72 and 74 to which the corresponding wires of line cord 12 are connected. Also, ground wire 76 connects plug blade 18, which provides a solid ground connection within the receptacle wherein the GFCI plug is inserted, to terminal 78, to which a ground wire from the load within line cord 12 is connected.

A conventional, electro-mechanical relay within module 10 includes movable contacts 80 and 82, interposed in conductors 68 and 70, respectively, and biased to the normally open position shown in FIG. 5. Relay coil 84 maintains contacts 80 and 82 in the closed position when pulsating DC power is provided to the coil from bridge rectifier 84, connected across conductors 68 and 70 when module 10 is connected to the AC power source, through the collector and emitter of transistor Q1. Conductors 68 and 70 form single turn primaries of differential transformer L1. An imbalance of current flow through conductors 68 and 70, indicating a possibly dangerous condition as when an undesired path to ground is present on the load side of the GFCI, induces a current in the secondary of transformer L1. Through the action of amplifier Q2 and its associated feedback circuit, indicated generally by reference numeral 86, an induced current of sufficient magnitude in the transformer secondary will result in application of a voltage to zener Z1 exceeding the breakover voltage. This will charge capacitor C1 to a level which applies a triggering voltage to the gate of SCR Q3, thereby providing a path to ground through the anode and cathode of the SCR and resistor R1 for current otherwise applied through resistor R2 to the base of transistor Q1. The values of capacitor C1 and resistor R1 are established to cause SCR Q3 to remain in a conductive condition after firing. That is, the voltage drop across resistor R1 causes capacitor C1 to hold the charge which was developed through zener Z1. Therefore, SCR Q3 remains in the conductive or "on" condition even after current flow through zener Z1 has stopped, and coil 84 cannot be re-energized to actuate the relay until the charge has been removed from capacitor C1.

Upon removal of base current, transistor Q1 switches to the non-conducting state, thus removing current flow to coil 84 and deactuating the relay. Movable contacts 80 and 82 move to the open position, interrupting the circuit between the power source and electrical load through conductors 68 and 70 as desired in response to the sensed fault condition. A second differential transformer L2 has a primary winding which couples a small amount of DC voltage to conductors 68 and 70, which form the primaries of transformer L2 in order that the GFCI will operate as intended even though the neutral conductor is grounded on the load side of the GFCI. A comprehensive description of the complete circuit, including the function of all illustrated components, may be found in earlier referenced application Ser. No. 539,153, although the foregoing general description is adequate for an understanding of the present invention.

The switch elements described earlier in physical form are shown in the electrical circuit of FIG. 5 at the right side thereof, using the same reference numerals to identify the elements in both their physical and schematically indicated forms. Solder connection 58, as explained earlier, both physically and electrically connects central portion 56 of conducting strip 54 to circuit board 32. The circuit board terminal at connection 58 is in electrical communication through conducting portion 88 with neutral conductor 70 at the source side of the GFCI. Fixed pin 50 communicates through conducting portion 90 with hot conductor 68 on the load side of the GFCI. Thus, manual depression of flexible boot 34 to move the associated push rod and flex strip end 60 into contact with pin 50 connects hot line 68 on the load side of transformer L1 to neutral line 70 on the source side, thereby providing a path between the two conductors which bypasses the transformer. If the GFCI is operating properly, current flow through the portions of conductors 68 and 70 forming the primaries of transformer L1 will be unequal, inducing a current in the secondary and deactuating the relay in the manner previously described.

Upon deactuation of the relay, contacts 80 and 82 move to the open position with respect to conductors 68 and 70 and the circuit is interrupted in the desired manner. When movable contact 80 is in the open position with respect to conductor 68, it is closed with another contact 92 which communicates through line 94 with one side of lamp 64. The other side is connected through conducting portion 96 of the circuit board to the terminal at connection 58, and thus with neutral conductor 70. Therefore, proper response of the GFCI to actuation of the test switch is indicated to the operator by illumination of lamp 64.

When manual pressure is removed from boot 34 it returns, together with the associated push rod, to its original, dome-shaped configuration due to the natural spring action of the flexible material and shape thereof. The springy material of strip 54 also acts to return end 60 thereof to its original (solid line) position, out of contact with pin 50. However, since SCR Q3 remains in the conducting state due to the charge on capacitor C1, as also previously explained, the relay is not re-actuated even though conductors 68 and 70 are still connected to the source, and the circuit remains in an open (interrupted) condition. In order to resume normal operation, the reset switch must be operated by manually depressing boot 36 to move the associated push rod, flexing end 62 of strip 54 to the dotted line position, out of contact with fixed pin 52. This disconnects neutral conductor 70 from one of the inputs to bridge circuit 84, thereby stopping current flow through SCR Q3 and allowing capacitor C1 to discharge. When boot 36 is released, the action is the same as that of the test switch, with boot 36, the associated push rod and strip end 62 returning to their normal (solid line) positions. The relay will again be energized to move contacts 80 and 82 to the closed position, connecting the source to the load, since SCR Q3 is no longer conductive. Lamp 64 goes off and normal operation is resumed. Of course, capacitor C1 will also be discharged by disconnecting conductors 68 and 70 from the AC source by removing the plug from the receptacle, and normal operation will resume when the plug is replaced.

From the foregoing, it is apparent that the disclosed switch means achieves all objects of the invention through a unique, cooperative arrangement of hardware and circuitry. The structural features are particularly suited to incorporation with GFCI devices to provide test and reset function.

What is claimed is:

1. A ground fault circuit interrupter module having switch means for selectively testing and resetting a circuit-interrupting means, said module comprising:
    a. a housing including a rigid, substantially planar cover member;
    b. first and second, manually movable actuating members having portions mounted in spaced relation upon said cover member;
    c. a generally planar printed circuit board mounted within said housing and having a portion in proximity to said cover member, said board carrying at least a portion of said circuit-interrupting means, and including said switch means;
    d. first and second electrical contact pins fixedly attached to and extending outwardly in the same direction from said board at spaced positions along a line substantially parallel to the plane of said cover member;
    e. first and second discrete terminals on said board to which said first and second pins are respectively physically and electrically connected;
    f. an elongated strip of electrically conducting, springy metal having a central portion essentially midway between opposite, first and second end portions;
    g. a third discrete terminal on said board located between said first and second terminals;
    h. a solder connection physically and electrically connecting said central portion of said strip to said third terminal, said solder connection providing the sole means of physical support of said strip, said first and second end portions extending to positions in proximity to said first and second pins, respectively, for movement into and out of contact therewith by flexing said strip about said central portion; and
    i. portions on each of said first and second actuating members positioned to contact said first and second end portions, respectively, to move the latter into and out of contact with said first and second contact pins in response to manual movement of said actuating members, said first, second and third terminals being so arranged in said circuit-interrupting module that movement of said first end portion operates a first switch means to create a simulated ground fault to actuate said circuit-interrupting means, and movement of said second end portion operates second switch means to electrically restore said circuit-interrupting means to its operative, non-actuated condition, said third terminal being common to the circuits of both said first and second switch means.

2. The invention according to claim 1 wherein said circuit-interrupting means comprises a relay having a pair of movable contact members arranged in the hot and neutral conductors of a power line extending between an AC power source and a load, said first switch means being normally open, said first terminal being connected to one of said conductors on the load side of said relay and said third terminal being connected to the other of said conductors on the source side of said relay.

3. The invention according to claim 2 wherein said circuit-interrupting means further comprises a transformer which senses an imbalance of current flow in said conductors, and generates a signal in response thereto causing said relay contacts to open, said first and third terminals being connected to opposite ones of said conductors on the load and source sides, respectively, of said transformer.

* * * * *